(12) United States Patent
Hogan et al.

(10) Patent No.: US 8,618,223 B2
(45) Date of Patent: *Dec. 31, 2013

(54) FUNCTIONALIZED POLYMERS AND TIRES THEREFROM

(75) Inventors: Terrence E. Hogan, Akron, OH (US); William L. Hergenrother, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/431,278

(22) Filed: Mar. 27, 2012

(65) Prior Publication Data

US 2012/0180937 A1 Jul. 19, 2012

Related U.S. Application Data

(63) Continuation of application No. 11/507,690, filed on Aug. 22, 2006, now Pat. No. 8,158,725.

(60) Provisional application No. 60/710,507, filed on Aug. 22, 2005.

(51) Int. Cl.
*C08F 36/04* (2006.01)
*C08C 19/20* (2006.01)
*C08L 9/00* (2006.01)

(52) U.S. Cl.
USPC .............. 525/331.9; 525/326.1; 525/332.3; 525/343

(58) Field of Classification Search
USPC .......... 525/326.1, 331.9, 332.3, 332.9, 333.1, 525/333.2, 342, 343, 374
See application file for complete search history.

(56) References Cited

U.S. PATENT DOCUMENTS

| | | | | | |
|---|---|---|---|---|---|
| 3,070,579 | A | * | 12/1962 | Szwarc | 525/333.3 |
| 3,410,836 | A | * | 11/1968 | Hsieh et al. | 525/339 |
| 3,458,491 | A | * | 7/1969 | Dennis | 526/82 |
| 3,488,332 | A | * | 1/1970 | Hiraoka et al. | 526/79 |
| 3,687,913 | A | * | 8/1972 | Hoshino et al. | 526/64 |
| 3,755,269 | A | * | 8/1973 | Uraneck et al. | 525/332.9 |

OTHER PUBLICATIONS

Quirk, Roderic P. et al "Characterization of the Functionalization Reaction Product of Poly(styryl)lithium with Ethylene Oxide" Journal of Polymer Science Part A vol. 26 (1988) pp. 2031-2037.*

* cited by examiner

*Primary Examiner* — Irina S Zemel
*Assistant Examiner* — Jeffrey Lenihan
(74) *Attorney, Agent, or Firm* — Meredith E. Hooker; Arthur M. Reginelli

(57) ABSTRACT

A method for preparing a functionalized polymer, the method comprising providing a reactive polymer, where the reactive polymer includes an oxygen anion, a sulfur anion, or a nitrogen anion, reacting the reactive polymer with carbon disulfide to form a polymer including a dithio carboxyl group, and reacting the polymer including the dithio carboxyl group with a blocking agent.

12 Claims, No Drawings

FUNCTIONALIZED POLYMERS AND TIRES THEREFROM

This application is a continuation application of U.S. Non-Provisional application Ser. No. 11/507,690, filed Aug. 22, 2006, now U.S. Pat. No. 8,158,725 which gains the benefit of U.S. Provisional Application No. 60/710,507, filed Aug. 22, 2005, which are incorporated herein by reference.

FIELD OF THE INVENTION

One or more embodiments of this invention relates to functionalized polymers and their use in the manufacture of tires.

BACKGROUND OF THE INVENTION

In the art of making tires, it may be desirable to employ rubber vulcanizates that demonstrate reduced hysteresis loss, i.e., less loss of mechanical energy to heat. Hysteresis loss can be attributed to polymer free ends within the cross-linked rubber network, as well as the disassociation of filler agglomerates. The degree of dispersion of filler within the vulcanizate can also be a factor because increased dispersion may provide better wear resistance.

Functionalized polymers have been employed to reduce hysteresis loss and increase bound rubber. The functional group of the functionalized polymer is believed to reduce the number of polymer free ends via interaction with filler particles. Also, this interaction may reduce filler agglomeration, which can thereby reduce hysteretic losses attributable to the disassociation of filler agglomerates (i.e., Payne effect).

Conjugated diene monomers can be anionically polymerized by using alkyllithium compounds as initiators. Selection of certain alkyllithium compounds can provide a polymer product having functionality at the head of the polymer chain. A functional group can also be attached to the tail end of an anionically-polymerized polymer by terminating a living polymer with a functionalized compound.

For example, trialkyltin chlorides, such as tributyl tin chloride, have been employed to terminate the polymerization of conjugated dienes, as well as the copolymerization of conjugated dienes and vinyl aromatic monomers, to produce polymers having a trialkyltin functionality at the tail end of the polymer. These polymers have proven to be technologically useful in the manufacture of tire treads that are characterized by improved traction, low rolling resistance, and improved wear.

Because functionalized polymers are advantageous, especially in the preparation of tire compositions, there exists a need for additional functionalized polymers. Moreover, because precipitated silica has been increasingly used as reinforcing particulate filler in tires, functionalized elastomers having affinity to silica filler are needed.

SUMMARY OF THE INVENTION

In one or more embodiments, the present invention includes a method for preparing a functionalized polymer, the method comprising providing a reactive polymer, where the reactive polymer includes an oxygen anion, a sulfur anion, or a nitrogen anion, reacting the reactive polymer with carbon disulfide to form a polymer including a dithio carboxyl group, and reacting the polymer including the dithio carboxyl group with a blocking agent.

In one or more embodiments, the present invention also includes a method of preparing a tire, the method comprising preparing a functionalized polymer as set forth in claim 1, preparing a rubber formulation that includes the functionalized polymer, formulating the rubber formulation into a green tire tread, assembling a green tire that includes said green tread, and curing said green tire.

DETAILED DESCRIPTION OF ILLUSTRATIVE EMBODIMENTS

One or more embodiments of the present invention are directed toward a functionalized polymer including a blocked dithiocarboxyl group, as well as the use of these functionalized polymers in the manufacture of tire components. Other embodiments include a method for preparing these functionalized polymers, as well as methods of using these polymers in the manufacture of tire components.

The functionalized polymers of one or more embodiments of the present invention can be defined by the formula

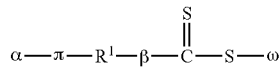

where $\alpha$ is a hydrogen atom, monovalent organic group, or a functionality or functional group that has a desirable impact on filled rubber compositions or vulcanizates, $\pi$ includes a polymer chain substituent, $R^1$ is bond or a divalent organic group, $\beta$ is a bond or a nitrogen, sulfur, or oxygen atom, and $\omega$ is a blocking group.

In one or more embodiments, functionalities or functional groups that have a desirable impact on filled rubber compositions or vulcanizates include those groups or substituents that react or interact with rubber or fillers employed in rubber compositions. In one or more embodiments, functional groups include those substituents that reduce the 50° C. hysteresis loss of a carbon black-filled vulcanizate as compared to similar carbon black-filled vulcanizates without the functional group. In one or more embodiments, this reduction in hysteresis loss is at least 5%, in other embodiments at least 10%, and in other embodiments at least 15%. In other embodiments, functional groups include those groups that will have a similar impact on silica-filled or mixed carbon black/silica-filled compositions. In one or more embodiments, the functional groups include a hetero atom. These hetero atom-bearing substituents include those that may generally be characterized as an electron rich species or metal-containing species. Functional groups include those substituents that react or interact with rubber or rubber fillers or otherwise have a desirable impact on filled rubber compositions or vulcanizates.

Numerous functional groups are known in the art. Exemplary functional groups include tin-containing groups, nitrogen-containing groups, boron-containing groups, oxygen-containing groups, phosphorus-containing groups, and sulfur-containing groups. Exemplary tin-containing groups include trialkyltin groups such as tributyl tin and trioctyltin groups. Exemplary nitrogen-containing groups include cyclic amine groups such as hexamethyleneimine groups, pyrollidine groups, and aziridine groups. Exemplary sulfur-containing groups include sulfur-containing azaheterocycle groups, and dithiane groups. Exemplary oxygen-containing groups include carbonyl-containing groups, oxygen-containing and azaheterocycle.

Exemplary phosphorus-containing functionalized polymers are disclosed in U.S. Pat. No. 4,485,833; exemplary oxygen-containing azaheterocycle functionalized polymers are disclosed in U.S. Pat. No. 6,596,798; exemplary oxygen-containing and sulfur-containing heterocycle functionalized polymers are disclosed in International Publication Nos. WO 2004/020475; exemplary trialkyl tin substituent functionalized polymers are disclosed in U.S. Pat. No. 5,268,439; exemplary cyclic amine functionalized polymers are disclosed in U.S. Pat. Nos. 6,080,853, 5,786,448, 6,025,450, and 6,046, 288; exemplary aryl or alkyl thio acetal (e.g., dithianes) functionalized polymers are disclosed in International Publication No. WO 2004/041870, all of which are incorporated herein by reference.

In one or more embodiments, the polymer chain may include rubber polymers, which include those polymers that are capable of being vulcanized. Types of rubber polymers include those synthesized from conjugated diene monomer optionally in combination with copolymerizable monomer such as vinyl aromatic monomer; these polymers may be referred to as polydienyl polymers or polydienyl copolymers. In one or more embodiments, the polymer chain includes polymers prepared by anionic polymerization. Examples of these polymers include polybutadiene, polyisoprene, poly (styrene-co-butadiene), poly(styrene-co-butadiene-co-isoprene), poly(isoprene-co-styrene), and poly(butadiene-co-isoprene).

In one embodiment, the polymer chain includes a polymer that has a glass transition temperature (Tg) of less than 0° C., in other embodiments less than −20° C., and in other embodiments less than −30° C. In one or more embodiments, the rubber polymer chain exhibits a single glass transition temperature.

In one or more embodiments, the polymer chain may be characterized by a number average molecular weight ($M_n$) of from about 5 to about 1,000 kg/mole, in other embodiments from about 50 to about 500 kg/mole, and in other embodiments 100 to about 300 kg/mole, as measured by using Gel Permeation Chromatography (GPC) calibrated with polystyrene standards and adjusted for the Mark-Houwink constants for the polymer in question. In one or more embodiments, the polymer chain may by characterized by a molecular weight distribution that is less than 4, in other embodiments less than 2.5, and in other embodiments less than 1.8; in these or other embodiments, the polymer chain may be characterized by a molecular weight distribution greater than 1. As those skilled in the art will appreciate, certain functionalized polymers may be coupled, which will increase molecular weight distribution as measured by GPC.

In one or more embodiments, the divalent organic group may include a hydrocarbylene group or substituted hydrocarbylene group such as, but not limited to, alkylene, cycloalkylene, substituted alkylene, substituted cycloalkylene, alkenylene, cycloalkenylene, substituted alkenylene, substituted cycloalkenylene, arylene, and substituted arylene groups, with each group preferably containing from 1 carbon atom, or the appropriate minimum number of carbon atoms to form the group, up to about 20 carbon atoms. Substituted hydrocarbylene group includes a hydrocarbylene group in which one or more hydrogen atoms have been replaced by a substituent such as an alkyl group. The divalent organic groups may also contain one or more heteroatoms such as, but not limited to, nitrogen, oxygen, boron, silicon, sulfur, and phosphorus atoms. In one or more embodiments, the divalent organic group will not react with a living anionic polymer.

In one or more embodiments, a blocking group may include a group or substituent that can prevent, preclude, or minimize reaction of the sulfur atom to which it is attached with other compounds at certain temperatures and/or in the presence of a catalyst. In one or more embodiments, the blocking group can be disassociated from or removed from the terminal sulfur group when subjected to energy and/or a catalyst. For example, thermal and/or mechanical energy may displace the blocking group, thereby allowing the terminal sulfur group to react with other compounds. For example, in one or more embodiments, when the functionalized polymers of this invention are compounded in rubber formulations, high temperature mixing (e.g., from about 100 to about 180° C.) can cause the blocking group to disassociate from the terminal sulfur group, and thereby allow the terminal sulfur group to react with points or areas of unsaturation within the rubber recipe. Elevated temperatures may not be necessary where a catalyst is present. In one or more embodiments, useful catalysts include those compounds that can react with a thioester or thiolated mercaptan functionality and thereby free the blocking group. These compounds may include those bearing an acidic hydrogen or, especially where the blocking group includes a silicon atom, those compounds including a fluoride anion. In other embodiments, certain sulfur accelerators can be employed such as benzothiazole sulfenamides or benzothiazole. In other embodiments, the combination of a zinc salt (e.g., zinc stearate) and a zinc oxide may be employed. In one or more embodiments, the catalyst is advantageously present in tire recipes. Other catalysts are disclosed in U.S. Pat. No. 6,579,949, which is incorporated herein by reference.

The method of one or more embodiments of this invention includes providing a reactive polymer, reacting the reactive polymer with carbon disulfide ($CS_2$) to form a polymer including a dithiocarboxyl group, and reacting the polymer including the dithiocarboxyl group with a blocking agent.

In one or more embodiments, a reactive polymer includes a polymer chain bearing or including a carbon anion, a sulfur anion, an oxygen anion, or a nitrogen anion. The polymer chain may be defined in a manner consistent with the polymer chain defined above.

In one or more embodiments, the reactive polymer bearing a carbon anion may include a living polymer. Living polymers include polymers prepared by anionic polymerization techniques, which include a carbon anion at their reactive end. These polymers may be formed by reacting anionic initiators with certain unsaturated monomers to propagate a polymeric structure. Throughout formation or propagation of the polymer, the polymeric structure may be anionic and "living." In other words, a carbon anion is present. A new batch of monomer subsequently added to the reaction can add to the living ends of the existing chains and increase the degree of polymerization. A living polymer, therefore, may include a polymeric segment having an anionic, reactive end. Anionic polymerization is further described in George Odian, *Principles of Polymerization*, ch. 5 ($3^{rd}$ Ed. 1991), or Panek, 94 J. Am. Chem. Soc., 8768 (1972), which are incorporated herein by reference. Reference to anionically polymerized polymers or anionically polymerized living polymers refer to those polymers prepared by anionic polymerization techniques.

Monomers that can be employed in preparing an anionically polymerized living polymer include any monomer capable of being polymerized according to anionic polymerization techniques. These monomers include those that lead to the formation of elastomeric homopolymers or copolymers. Suitable monomers include, without limitation, conjugated $C_4$-$C_{12}$ dienes, $C_8$-$C_{18}$ monovinyl aromatic monomers, and $C_6$-$C_{20}$ trienes. Examples of conjugated diene monomers include, without limitation, 1,3-butadiene, isoprene, 1,3-pentadiene, 2,3-dimethyl-1,3-butadiene, and 1,3-hexadiene. A non-limiting example of trienes includes myrcene. Aromatic vinyl monomers include, without limitation, styrene, α-methyl styrene, p-methylstyrene, and vinylnaphthalene. When preparing elastomeric copolymers, such as those containing conjugated diene monomers and aromatic vinyl monomers, the conjugated diene monomers and aromatic vinyl monomers can be used at a ratio of 95:5 to 50:50, and preferably 95:5 to 65:35.

Any anionic initiator can be employed to initiate the formation and propagation of the living polymers. Exemplary anionic initiators include, but are not limited to, alkyl lithium initiators such as n-butyl lithium, arenyllithium initiators, arenylsodium initiators, N-lithium dihydro-carbon amides, aminoalkyllithiums, and alkyl tin lithiums. Other useful initiators include N-lithiohexamethyleneimide, N-lithiopyrrolidinide, and N-lithiododecamethyleneimide as well as organolithium compounds such as the tri-alkyl lithium adducts of substituted aldimines and substituted ketimines, and N-lithio salts of substituted secondary amines. Exemplary initiators are also described in the following U.S. Pat. Nos. 5,332,810, 5,329,005, 5,578,542, 5,393,721, 5,698,646, 5,491,230, 5,521,309, 5,496,940, 5,574,109, 5,786,441, and International Publication No. WO 2004/020475, which are incorporated herein by reference. In one or more embodiments, the initiator employed advantageously imparts a functional group at the head of the polymer chain. The functional group may react or interact with rubber or rubber fillers or otherwise have a desirable impact on filled rubber compositions or vulcanizates including those described above.

The amount of initiator employed in conducting anionic polymerizations can vary based upon the desired polymer characteristics. In one embodiment, from about 0.1 to about 100, and in other embodiments from about 0.33 to about 10 mmol of lithium per 100 g of monomer is employed.

Anionic polymerizations may be conducted in a polar solvent such as tetrahydrofuran (THF), or in a nonpolar hydrocarbon such as the various cyclic and acyclic hexanes, heptanes, octanes, pentanes, their alkylated derivatives, and mixtures thereof, as well as benzene.

In order to promote randomization in copolymerization and/or to control vinyl content, a polar coordinator may be added to the polymerization ingredients. These randomizers may be used in amounts between 0 and 90 or more equivalents per equivalent of lithium. The amount may depend on the amount of vinyl desired, the level of styrene employed and the temperature of the polymerization, as well as the nature of the specific polar coordinator (modifier) employed. Suitable polymerization modifiers include, for example, ethers or amines to provide the desired microstructure and randomization of the comonomer units.

Compounds useful as polar coordinators include those having an oxygen or nitrogen heteroatom and a non-bonded pair of electrons. Examples include dialkyl ethers of mono and oligo alkylene glycols; "crown" ethers; tertiary amines such as tetramethylethylene diamine (TMEDA); linear THF oligomers; and the like. Specific examples of compounds useful as polar coordinators include tetrahydrofuran (THF), linear and cyclic oligomeric oxolanyl alkanes such as 2,2-bis(2'-tetrahydrofuryl)propane, di-piperidyl ethane, dipiperidyl methane, hexamethylphosphoramide, N—N'-dimethylpiperazine, diazabicyclooctane, dimethyl ether, diethyl ether, tributylamine and the like. Linear and cyclic oligomeric oxolanyl alkane modifiers are described in U.S. Pat. No. 4,429,091, which is incorporated herein by reference.

Anionically polymerized living polymers can be prepared by either batch or continuous methods. A batch polymerization may be begun by charging a blend of monomer(s) and normal alkane solvent to a suitable reaction vessel, followed by the addition of the polar coordinator (if employed) and an initiator compound. The reactants can be heated to a temperature of from about 20 to about 130° C. and the polymerization may be allowed to proceed for from about 0.1 to about 24 hours. This reaction can produce a reactive polymer having a reactive or living end. In one or more embodiments, at least about 30% of the polymer molecules contain a living end, in other embodiments at least about 50% of the polymer molecules contain a living end, and in other embodiments at least about 80% contain a living end.

In other embodiments, a reactive polymer bearing a oxygen anion can be prepared by reacting a living polymer with a oxygen compound selected from cyclic oxides having sufficient ring strain to react with the living polymer, lactones, aldehydes, ketones, or mixtures thereof.

Cyclic oxides that have sufficient ring strain to react with a living polymer include oxiranes (i.e. 3-membered rings) and oxetanes (i.e. 4-membered rings). Oxiranes may include unsubstituted oxiranes and alkyl, aryl, and mixed alkyl/aryl-substituted oxiranes, and disubstituted alkylenyl oxiranes. Unsubstituted oxirane includes ethylene oxide. Alkyl-substituted oxiranes include, for example, alkyl oxirane (i.e. alkylene oxide), 2,2-dialkyl oxirane, 2,3-dialkyl oxirane, and tri-alkyl oxirane. Aryl-substituted oxiranes include, for example, aryl oxirane, 2,2-diaryl oxirane, 2,3-diaryl oxirane, and tri-aryl oxirane. Mixed alkyl/aryl-substituted oxiranes include, for example, 2-alkyl,2-aryl oxirane. Disubstituted alkylenyl oxiranes, which are bicyclic compounds, include cyclohexane oxide. Alkylenyl groups include divalent organic groups described above. The alkyl groups may be linear, branched, or cyclic, and the aryl groups may be substituted or unsubstituted. The alkyl or aryl groups may include heteroatoms. Exemplary alkyl groups include methyl, ethyl, propyl, isopropyl, cyclopropyl, butyl, iso-butyl, tert-butyl, pentyl, cyclopentyl, isopentyl, hexyl, cyclohexyl, heptyl, octyl, cyclooctyl, and nonyl groups. Exemplary aryl groups include phenyl, napthyl, and tolyl groups. The multi-substituted oxiranes (e.g. 2,2-dialkyl oxirane) may include the same or different groups (e.g. alkyl groups).

In a similar fashion to the oxiranes, oxetanes may include unsubstituted oxetanes and alkyl, aryl, and mixed alkyl/aryl-substituted oxetanes, and disubstituted alkylenyl oxetanes. Exemplary oxetanes include oxetane, 2-alkyl oxetane, 3-alkyl oxetane, 2,2-dialkyl oxetane, 2,3-dialkyl oxetane, 2,4-dialkyl oxetane, 3,3-dialkyl oxetane, 2,3,3-trialkyl oxetane, 2,2,3-trialkyl oxetane, 2,2,4-trialkyl oxetane, and 2,3,4-trialkyl oxetane. As with the oxirane embodiments, useful examples also include the aryl and mixed alkyl/aryl analogs of the foregoing oxetane compounds. The tetra, penta and hexa-alkylated versions of the foregoing may also be useful.

In one or more embodiments, lactones include cyclic organo oxides including a carbonyl group adjacent to a ring oxygen. In these or other embodiments, lactones may include an inner ester of a carboxylic acid formed by intramolecular reaction of hydroxylated or halogenated carboxylic acids with elimination of water or the corresponding halogenated acid. The ring may include one or more heteroatoms, but in one or more embodiments does not include a hydrogen atom reactive with a living polymer chain. One or more of these compounds can be defined by the formula

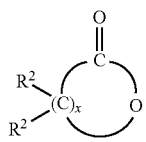

where each $R^2$ is independently a hydrogen atom or a monovalent organic group, and x is an integer from about 2 to about 10. In one or more embodiments, x may be an integer from 3 to 7. Examples of lactones include γ-butyrolactone, γ-caprolactone, and γ-propiolactone.

In one or more embodiments, monovalent organic groups may include hydrocarbyl groups or substituted hydrocarbyl groups such as, but not limited to alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to 20 carbon atoms. These hydrocarbyl groups may contain heteroatoms such as, but not limited to, nitrogen, boron, oxygen, silicon, sulfur, and phosphorus atoms. In one or more embodiments, monovalent organic groups will not react with a living polymer.

In one or more embodiments, aldehydes include organic compounds that include a terminal carbonyl group. One or more of these compounds can be defined by the formula $R^3(H)C=O$, where $R^3$ includes a monovalent organic group. Examples of aldehydes include benzaldehyde, acetaldehyde, cyclohexanal, and formaldehyde.

In one or more embodiments, ketones include organic compounds that include a internal carbonyl group. One or more of these compounds can be defined by the formula $R^4C(O)R^5$, where $R^4$ and $R^5$ are each independently monovalent organic groups, or where $R^4$ and $R^5$ may join to form a divalent organic group, which results in a cyclic compound. Examples of ketones include benzophenone, cyclohexanone, and acetone.

In one or more embodiments, a reactive polymer bearing a sulfur anion can be prepared by reacting a living polymer with a sulfur compound selected from cyclic sulfides having sufficient ring strain to react with the living polymer, a thiolactone, a dithiolactone, a thioaldehyde, a thioketone, or a mixture thereof.

Cyclic sulfides that have sufficient ring strain to react with a living polymer include thiiranes (i.e. 3-membered rings) and thietanes (i.e. 4-membered rings).

Thiiranes may include unsubstituted thiiranes and alkyl, aryl, and mixed alkyl/aryl-substituted thiiranes, and disubstituted alkylenyl thiiranes. Unsubstituted thiirane include ethylene sulfide. Alkyl-substituted thiiranes include, for example, alkyl thiirane (i.e. alkylene sulfide), 2,2-dialkyl thiirane, 2,3-dialkylthiirane, and trialkyl thiirane. Aryl-substituted thiiranes include, for example, aryl thiirane, 2,2-diaryl thiirane, 2,3-diaryl thiirane, and triaryl thiirane. Mixed alkyl/aryl-substituted thiiranes include, for example, 2-alkyl,2-aryl thiirane. Disubstituted alkylenyl thiiranes, which are bicyclic compounds, include cyclohexane sulfide. Alkylenyl groups include divalent organic groups described above. The alkyl groups may be linear, branched, or cyclic, and the aryl groups may be substituted or unsubstituted. The alkyl or aryl groups may include heteroatoms. Exemplary alkyl groups include methyl, ethyl, propyl, isopropyl, cyclopropyl, butyl, isobutyl, tert-butyl, pentyl, cyclopentyl, isopentyl, hexyl, cyclohexyl, heptyl, octyl, cyclooctyl, and nonyl groups. Exemplary aryl groups include phenyl, napthyl, and tolyl groups. The multi-substituted thiiranes (e.g. 2,2-dialkyl thiirane) may include the same or different groups (e.g. alkyl groups).

In a similar fashion to the thiiranes, thietanes may include unsubstituted thietanes and alkyl, aryl, and mixed alkyl/aryl-substituted thietanes, and disubstituted alkylenyl thietanes. Exemplary thietanes include thietane, 2-alkyl thietane, 3-alkyl thietane, thietane, 2,2-dialkyl thietane, 2,3-dialkyl thietane, 2,4-dialkyl thietane, 3,3-dialkyl thietane, 2,3,3-trialkyl thietane, 2,2,3-trialkyl thietane, 2,2,4-trialkyl thietane, and 2,3,4-trialkyl thietane. As with the thiirane embodiments, useful examples also include the aryl and mixed alkyl/aryl analogs of the foregoing thietane compounds. The tetra, penta and hexa-alkylated versions of the foregoing may also be useful.

In one or more embodiments, thiolactones and dithiolactones include cyclic organo sulfide compounds that include a carbonyl or thiocarbonyl (i.e. C=S) group adjacent to the ring sulfur. The ring may also include heteroatoms, but in one or more embodiments does not include a hydrogen atom reactive with a living polymer chain. One or more of these compounds can be defined by the formula

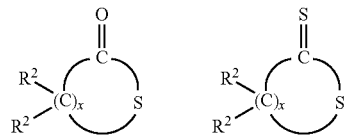

where each $R^2$ is independently a hydrogen atom or a monovalent organic group, and x is an integer from about 2 to about 10. In other embodiments, x may be an integer of from 3 to 7. Examples of thiolactones and dithiolactones include thiobutyrolactone, thiopropiolactone, thiovalerolactone, thiocaprolactone, dithiobutyrolactone, dithiopropiolactone, dithiovalerolactone, and dithiocaprolactone.

In one or more embodiments, thioaldehydes include organic compounds that include a terminal thio carbonyl group. One or more of these compounds can be defined by the formula $R^3(H)C=S$, where $R^3$ includes a monovalent organic group. Examples of thioalkehydes include thioacetaldehyde, thiobenzaldehyde, and thioprionaldehyde.

In one or more embodiments, thioketones include organic compounds that include a internal thio carbonyl group. One or more of these compounds can be defined by the formula $R^4C(S)R^5$, where $R^4$ and $R^5$ each independently include monovalent organic groups, or where $R^4$ and $R^5$ may join to form a divalent organic group, which results in a cyclic compound. Examples of thioketones include thiobenzophenone, thioacetone, thiocyclohexanone, and thioacetophenone.

In one or more embodiments, a reactive polymer bearing a nitrogen anion can be prepared by reacting a living polymer with a nitrogen compound selected from N-alkylated or N-arylated cyclic amines having sufficient ring strain to react with the living polymer, N-alkylated or N-arylated lactams, N-alkylated or N-arylated imines, N-alkylated or N-arylated cyclic ureas or a mixture thereof.

N-alkylated or N-arylated cyclic amines that have sufficient ring strain to react with a living polymer include 1-alkyl or 1-aryl aziridines (i.e. 3-membered rings) and N-alkylated azetidines (i.e. 4-membered rings).

1-alkyl or 1-aryl aziridines may be substituted or unsubstituted. An example of an unsubstituted 1-alkyl aziridine includes 1-methyl aziridine, and an example of a 1-aryl aziridine includes 1-phenyl aziridine. The substituted groups may include alkyl and aryl groups. Examples of substituted 1-alkyl aziridines include 1,2-dialkyl aziridine, 1,2,3-trialkyl aziridine, 1,2,2-trialkyl aziridine, and 1,2,2,3-tetraalkylaziridine. Examples of substituted 1-aryl aziridines include 1-aryl-2,2-dialkyl aziridine and 1-aryl-2,2,3-trialkyl aziridine. Mixed alkyl/aryl-substituted 1-alkyl or 1-aryl aziridines include, for example, 1-alkyl-2-aryl-3-alkyl aziridine. Disubstituted alkylenyl aziridines, which are bicyclic compounds, include 1-alkyl cyclohexane aziridine. Alkylenyl groups include divalent organic groups described above. The alkyl groups may be linear, branched, or cyclic, and the aryl groups may be substituted or unsubstituted. The alkyl or aryl groups may include heteroatoms. Exemplary alkyl groups include methyl, ethyl, propyl, isopropyl, cyclopropyl, butyl, iso-butyl, tert-butyl, pentyl, cyclopentyl, isopentyl, hexyl, cyclohexyl, heptyl, octyl, cyclooctyl, and nonyl groups. Exemplary aryl groups include phenyl, napthyl, and tolyl groups. The multi-substituted aziridines (e.g. 1-alkyl-2,3-dialkyl aziridine) may include the same or different groups (e.g. alkyl groups).

In a similar fashion to the 1-alkyl or 1-aryl aziridines, azetidines may include unsubstituted 1-alkyl or 1-aryl azetidines and alkyl, aryl, and mixed alkyl/aryl-substituted 1-alkyl or 1-aryl azetidines, and disubstituted alkylenyl 1-aryl or 1-alkyl azetidines. Exemplary 1-alkyl or 1-aryl azetidines include N-alkylazetidine, 1,2-alkyl azetidine, 1,3-alkyl azetidine, 1,2,2-trialkyl azetidine, 1,2,3-trialkyl azetidine, 1,2,4-trialkyl azetidine, 1,3,3-trialkyl azetidine, 1,2,3,3-tetraalkyl azetidine, 1,2,2,3-tetraalkyl azetidine, 1,2,2,4-tetraalkyl azetidine, and 1,2,3,4-tetraalkyl azetidine. As with the aziridine embodiments, useful examples also include the aryl and mixed alkyl/aryl analogs of the foregoing oxetane compounds. The tetra, penta and hexa-alkylated versions of the foregoing may also be useful.

In one or more embodiments, N-alkylated or N-arylated lactams include cyclic organo amides that include a carbonyl group adjacent to a ring nitrogen. The ring may include one or more heteroatoms, but in one or more embodiments does not include a hydrogen atom reactive with a living polymer chain. One or more of these compounds can be defined by the formula

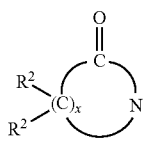

where each $R^2$ is independently a hydrogen atom or a monovalent organic group and x is an integer of from about 2 to about 20. In one or more embodiments, x may be an integer from 3 to 10. Examples of lactams include N-methyl pyrolidinones, N-methyl caprolactam, N-methyl butyrolactam, and N-methylpropiolactam.

In one or more embodiments, N-alkylated or N-arylated imines can be defined by the formula

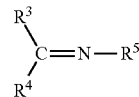

where $R^3$ and $R^4$ are each independently monovalent organic groups or a hydrogen atom, where $R^5$ is a monovalent organic group, or where $R^3$ and $R^4$, or $R^3$ and $R^5$, or $R^4$ and $R^5$ may be joined to form a divalent organic group. Where $R^3$ and $R^4$, or $R^3$ and $R^5$, or $R^4$ and $R^5$ join to form a divalent organic group, the resulting compound may include a cyclic or bicyclic structure. Examples of imines include diazabicyclounadecene, and diazabicyclononene.

In one or more embodiments, N-alkylated or N-arylated cyclic ureas include cyclic organo amides that include a carbonyl group adjacent to a ring nitrogen. The ring may include one or more heteroatoms, but in one or more embodiments does not include a hydrogen atom reactive with a living polymer chain. One or more of these compounds can be defined by the formula

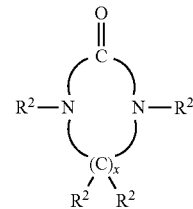

where each $R^2$ is independently a hydrogen atom or a monovalent organic group and x is an integer of from about 2 to about 20. In one or more embodiments, x may be an integer from 2 to 8. Examples of cyclic ureas include 1,3-diphenyl-2-imidazolidinone and 1,3-dimethyl-2-imidazolidinone.

In one or more embodiments, the formation of the reactive polymer, which bears a sulfur anion, oxygen anion, or nitrogen anion, may occur in solution at standard conditions. In one or more embodiments, the solution may be under an inert atmosphere. In one or more embodiments, the solution in which the reactive polymer may be formed may include a solvent. Useful solvents may include those solvents in which the reactive polymer and the sulfur-containing, oxygen-containing, or nitrogen-containing compounds and/or the reactants giving rise to these polymers are at least partially soluble. Exemplary solvents include polar solvents such as tetrahydrofuran (THF) or non-polar hydrocarbons solvents such as cyclic and acyclic hexanes, heptanes, octanes, pentanes, their alkylated derivatives, and mixtures thereof. Other non-polar hydrocarbon solvents that may be used include aromatic solvents such as benzene.

In one or more embodiments, the reaction leading to the formation of the polymer bearing a sulfur anion, oxygen anion, or nitrogen anion, may occur at temperatures from about −50° C. to about 150° C., and in other embodiments from about 0° C. to about 100° C. In one or more embodiments, the reaction medium may be maintained under an inert atmosphere such as a nitrogen or argon atmosphere.

The amount of reactants involved in the reaction between the living polymer and the sulfur, oxygen, or nitrogen-containing compounds can vary based upon the desired effect. In one or more embodiments, a molar excess of the sulfur, oxygen or nitrogen-containing compounds may be employed. In these or other embodiments, the molar ratio of living polymer to sulfur, oxygen, or nitrogen-containing compounds may be from about 0.1 to about 4, and in other embodiments from about 0.9 to about 1.5.

In one or more embodiments, the reaction between the polymer bearing the carbon anion, sulfur anion, oxygen anion, or nitrogen anion (i.e., reactive polymer) and carbon disulfide may occur in solution at standard conditions. In these or other embodiments, the solution may be under an inert atmosphere.

In one or more embodiments, the solution in which the reactive polymer and carbon disulfide takes place may include a solvent. Useful solvents include those solvents in which the and/or those solvents in which the reactants and/or products are at least partially soluble. Exemplary solvents include polar solvents such as tetrahydrofuran (THF) or non-polar hydrocarbons solvents such as cyclic and acylic hexanes, heptanes, octanes, pentanes, their alkylated derivatives, and mixtures thereof. Other non-polar hydrocarbon solvents that may be used include aromatic solvents such as benzene.

In one or more embodiments, the reaction between the polymer bearing the carbon anion, sulfur anion, oxygen anion, or nitrogen anion (i.e., reactive polymer) and carbon disulfide may occur at temperatures from about −50° C. to about 150° C., and in other embodiments from about 0° C. to about 100° C. In one or more embodiments, the reaction medium may be maintained under an inert atmosphere such as a nitrogen atmosphere.

The amount of the reactants involved in the reaction between the carbon disulfide and the reactive polymer can vary based upon the desired effect. In one or more embodiments, a molar excess of carbon disulfide may be employed. In these or other embodiments, the molar ratio of carbon disulfide to reactive polymer is from about 0.1 to about 4, and in other embodiments from about 0.9 to about 1.5.

Where the reactive polymer includes a sulfur, oxygen or nitrogen anion, which may result from reacting a living polymer with an oxygen, sulfur, or nitrogen compound, the reaction with carbon disulfide may occur after complete or substantially complete reaction between the living polymer and the oxygen, sulfur or nitrogen-containing compound. In one or more embodiments the reaction with carbon disulfide may occur after one minute, in other embodiments, after 10 minutes, in other embodiments after 20 minutes, and in other embodiments after 30 minutes of contacting the living polymer and the oxygen, sulfur, or nitrogen-containing compound.

As noted above, in one or more embodiments, by reacting the reactive polymer with carbon disulfide, a polymer including a dithiocarbonyl group is formed. This group, which is a reactive sulfur terminal group, can then be reacted with a blocking agent.

Examples of blocking agents include phenyldimethylchlorosilane, t-butyldimethylchlorosilane, diphenylmethylchlorosilane, triphenylchlorosilane, trimethylchlorosilane, trimethylchlorosilane, 2-ethylhexanoyl chloride, acetyl chloride, benzoyl chloride, t-butyl chloride, and mixtures thereof.

In one or more embodiments, the reaction between the polymer including a dithiocarbonyl group and the blocking agent may occur in solution at standard conditions. In these or other embodiments, the solution may be under an inert atmosphere.

The solution in which the polymer bearing the terminal sulfur and the blocking agent takes place may include a solvent. Useful solvents are described above. In one or more embodiments, the formation of the living polymer, the formation of the reactive polymer, the reaction with carbon disulfide, and the reaction with the blocking agent may all occur in the same solvent. In one or more embodiments, the reaction between the polymer bearing the dithiocarboxyl group and the blocking agent may occur after complete, or substantially complete, reaction between the reactive polymer and the carbon disulfide. In one or more embodiments, the reaction may occur after one minute, in other embodiments after 10 minutes, in other embodiments after 20 minutes, and in other embodiments after 30 minutes of contacting the carbon disulfide with the reactive polymer.

In one or more embodiments, the reaction between the polymer bearing the terminal sulfur group with the blocking agent may occur at temperatures from about −50° C. to about 150° C., and in other embodiments from about 0° C. to about 100° C. In one or more embodiments, the reaction medium may be maintained under an inert atmosphere such as a nitrogen atmosphere.

The amount of the reactants involved in the reaction between the polymer bearing the terminal sulfur and the blocking agent can vary based upon the desired effect. In one or more embodiments, a molar excess of blocking agent may be employed. In these or other embodiments, the molar ratio of polymer bearing the terminal sulfur to the blocking agent is from about 0.1 to about 4, and in other embodiments from about 0.9 to about 1.5.

After formation of the functionalized polymer, a processing aid and/or other optional additives such as oil can be added to the polymer cement. For example, an antioxidant can be added. The functionalized polymer and other optional ingredients can then be isolated from the solvent and dried. Conventional procedures for desolventization and drying may be employed. In one embodiment, the functionalized polymer may be isolated from the solvent by steam desolventization or hot water coagulation of the solvent followed by filtration. Residual solvent may be removed by using conventional drying techniques such as oven drying or drum drying. Alternatively, the cement may be directly steam desolventized.

The functionalized polymers of this invention are useful in preparing tire components. These tire components can be prepared by using the functionalized polymers of this invention alone or together with other rubbery polymers. Other rubbery polymers that may be used include natural and synthetic elastomers. The synthetic elastomers typically derive from the polymerization of conjugated diene monomers. These conjugated diene monomers may be copolymerized with other monomers such as vinyl aromatic monomers. Other rubbery elastomers may derive from the polymerization of ethylene together with one or more α-olefins and optionally one or more diene monomers.

Useful rubbery elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. Other ingredients that are typically employed in rubber compounding may also be added.

The rubber compositions may include fillers such as inorganic and organic fillers. The organic fillers include carbon black and starch. The inorganic fillers may include silica, aluminum hydroxide, magnesium hydroxide, clays (hydrated aluminum silicates), and mixtures thereof.

A multitude of rubber curing agents may be employed, including sulfur or peroxide-based curing systems. Curing agents are described in *Kirk-Othmer*, ENCYCLOPEDIA OF CHEMICAL TECHNOLOGY, Vol. 20, pgs. 365-468, (3$^{rd}$ Ed. 1982), particularly *Vulcanization Agents and Auxiliary Materials*, pgs. 390-402, and A. Y. Coran, *Vulcanization*, ENCYCLOPEDIA OF POLYMER SCIENCE AND ENGINEERING, (2$^{nd}$ Ed. 1989), which are incorporated herein by reference. Vulcanizing agents may be used alone or in combination.

Other ingredients that may be employed include accelerators, oils, waxes, scorch inhibiting agents, processing aids, zinc oxide, tackifying resins, reinforcing resins, fatty acids such as stearic acid, peptizers, and one or more additional rubbers.

These rubber compositions may be useful for forming tire components such as treads, subtreads, black sidewalls, body ply skins, bead filler, and the like. In one or more embodiments, the functional polymers of this invention are employed in tread formulations, and these tread formulations may include from about 10 to about 100% by weight of the functionalized polymer based on the total rubber within the formulation, in other embodiments, the tread formulation may include from about 35 to about 90% by weight, and in other embodiments from about 50 to 80% by weight of the functional polymer based on the total weight of the rubber within the formulation. The preparation of vulcanizable compositions and the construction and curing of the tire may not be affected by the practice of this invention.

The vulcanizable rubber composition can be prepared by forming an initial masterbatch that includes the rubber component and filler. This initial masterbatch can be mixed at a starting temperature of from about 25° C. to about 125° C. with a discharge temperature of about 135° C. to about 180° C. To prevent premature vulcanization (also known as scorch), this initial masterbatch may exclude any vulcanizing agents. Once the initial masterbatch is processed, the vulcanizing agents can be introduced and blended into the initial masterbatch at low temperatures in a final mix stage, which may not initiate the vulcanization process. Optionally, additional mixing stages, sometimes called remills, can be employed between the masterbatch mix stage and the final mix stage. Rubber compounding techniques and the additives employed therein are generally known as disclosed in *The Compounding and Vulcanization of Rubber*, in *Rubber Technology* (2$^{nd}$ Ed. 1973). The mixing conditions and procedures applicable to silica-filled tire formulations are also well known as described in U.S. Pat. Nos. 5,227,425, 5,719,207, 5,717,022, and European Patent No. 890,606, all of which are incorporated herein by reference.

Where the vulcanizable rubber compositions are employed in the manufacture of tires, these compositions can be processed into tire components according to ordinary tire manufacturing techniques including standard rubber shaping, molding and curing techniques. Typically, vulcanization can be effected by heating the vulcanizable composition in a mold; e.g., it is heated to about 140 to about 180° C. Cured or crosslinked rubber compositions may be referred to as vulcanizates, which generally contain three-dimensional polymeric networks that are thermoset. In one or more embodiments, the vulcanizate includes a vulcanized residue or vulcanization product of the functionalized polymer. The other ingredients, such as processing aides and fillers, may be evenly dispersed throughout the vulcanized network. Pneumatic tires can be made as discussed in U.S. Pat. Nos. 5,866,171, 5,876,527, 5,931,211, and 5,971,046, which are incorporated herein by reference.

In order to demonstrate the practice of the present invention, the following examples have been prepared and tested. The examples should not, however, be viewed as limiting the scope of the invention. The claims will serve to define the invention.

EXAMPLES

Example 1

To a 2-gallon reactor equipped with turbine agitator blades was added 1.45 kg of hexane, 0.46 kg of 34.0 wt % styrene in hexane, and 2.99 kg of 20.1 wt % butadiene in hexane. To the reactor was charged 4.05 ml of 1.54 M butyl lithium in hexane and 1.13 mL of 1.6 M 2,2'-di(tetrahydrofuryl)propane in hexane and the batch temperature was controlled at 49° C. After approximately 1 hour, part of the cement was discharged into nitrogen purged bottles.

Example 2

A bottle of cement was transferred from the 2-gallon reactor used in Example 1, and to this was added 1 equivalent of dimethylimidazolidinone per butyl lithium. After allowing the reaction to proceed about 30 minutes, 1 equivalent carbon disulfide per butyl lithium was charged. The bottle contents were then coagulated and drum dried. The isolated polymer had the following properties: $M_n$=145.9 kg/mol, $M_w$=187.3 kg/mol, $T_g$=-36.3° C., % Styrene=19.9, % Block Styrene=1.2, % 1,2 butadiene=53.0%. This polymer has been designated Sample 1.

Example 3

Another bottle of cement was transferred from the 2-gallon reactor used in Example 1 and to this was added 1 equivalent of dimethylimidazolidinone per butyl lithium. After allowing the reaction to proceed for about 30 minutes, 1 equivalent of carbon disulfide per butyl lithium was charged. After allowing the reaction with carbon disulfide to proceed for about 30 minutes, 1 equivalent of t-butyldimethlysilyl chloride per butyl lithium was charged. The bottle contents were then coagulated and drum dried. The isolated polymer had the following properties: $M_n$=143.9 kg/mol, $M_w$=170.6 kg/mol, $T_g$=-36.3° C., % Styrene=19.9, % Block Styrene=1.2, % 1,2 butadiene=53.0%. This polymer has been designated Sample 2.

Example 4

The functionalized polymers prepared above were each employed to prepare separate tire formulations that included either a silica and carbon black blend reinforcement. The recipe for the tire formulations are set forth in Table I.

TABLE I

| Ingredient | Mixed Silica Formulation (phr) |
| --- | --- |
| Functionalized Polymer | 100 |
| Carbon Black | 35 |
| Silica | 30 |
| Antiozonant | 0.95 |
| Zinc Oxide | 2.5 |

TABLE I-continued

| Ingredient | Mixed Silica Formulation (phr) |
|---|---|
| Stearic Acid | 1.5 |
| Oil | 10 |
| Wax | 1.03 |
| Coupling Agent | 4.57 |
| Binder | 0.8 |
| Sulfur | 1.7 |
| Accelerator | 2.0 |
| Scorch Inhibitor | 0.25 |

The tire formulations were mixed using conventional mixing procedures. Namely, the ingredients (excluding sulfur, accelerators, binder, coupling agents, and wax) were mixed to a drop temperature of about 168° C. Then, the coupling agent was subsequently added and mixed to a drop temperature of about 145° C. Then, the sulfur, accelerators, and wax were added in a subsequent mixing step and mixed to a drop temperature of about 95° C.

The formulations were then prepared into test specimens and cured within a closed cavity mold under pressure for 15 minutes at 171° C. The test specimens were then subjected to various physical tests, and the results of these tests are reported in Table II.

TABLE II

| | 1 | 2 |
|---|---|---|
| $ML_{1+4}$ @ 130° C. | 107.0 | 95.6 |
| 200% Modulus @ 23° C. (MPa) | 20.3 | 25.1 |
| Tensile Strength @ 23° C. (MPa) | 7.47 | 6.56 |
| Elongation at Break @ 23° C. (%) | 328 | 456 |
| Temperature Sweep 0° C. tan δ | 0.3362 | 0.3313 |
| Temperature Sweep 50° C. tan δ | 0.147 | 0.136 |
| ΔG' (MPa) | 2.830 | 1.966 |
| G' @ 5% strain 50° C. (MPa) | 4.105 | 3.609 |

Mooney viscosity measurement was conducted at 130° C. using a large rotor. The Mooney viscosity was recorded as the torque when the rotor has rotated for 4 minutes. The sample is preheated at 130° C. for 1 minute before the rotor starts.

The bound rubber content test was used to determine the percent of polymer bound to filler particles in tire tread stocks. Bound rubber was measured by immersing small pieces of uncured stocks in a large excess of toluene for three days. The soluble rubber was extracted from the sample by the solvent. After three days, any excess toluene was drained off and the sample was air dried and then dried in an oven at approximately 100° C. to a constant weight. The remaining pieces form a weak coherent gel containing the filler and some of the original rubber. The amount of rubber remaining with the filler is the bound rubber. The bound rubber content is then calculated according to the following:

$$\% \text{ Bound Polymer} = \frac{100(Wd - F)}{R} \quad (1)$$

where Wd is the weight of dried gel, F is the weight of filler in gel or solvent insoluble matter (same as weight of filler in original sample), and R is the weight of polymer in original sample.

The tensile mechanical properties were measured using the standard procedure described in the ASTM-D 412 at 25° C. and 100° C. The tensile test specimens had dumbbell shapes with a thickness of 1.9 mm. A specific gauge length of 25.4 mm is used for the tensile test. Heat aged data was obtained after heating the vulcanizates for 24 hours at 100° C.

Temperature sweep experiments were conducted with a frequency of 31.4 rad/sec using 0.5% strain for temperature ranging from −100° C. to −10° C., and 2% strain for the temperature ranging from −10° C. to 100° C. ΔG is the change in G' at 0.25% form G' at 14.75%. Payne effect (ΔG') data were obtained from the strain sweep experiment. A frequency of 3.14 rad/sec was used for strain sweep which is conducted at 50° C. with strain sweeping from 0.25% to 14.75%.

Various modifications and alterations that do not depart from the scope and spirit of this invention will become apparent to those skilled in the art. This invention is not to be duly limited to the illustrative embodiments set forth herein.

What is claimed is:

1. A method for preparing a functionalized polymer, the method comprising:
   providing a reactive polydienyl polymer or polydienyl copolymer, where the reactive polymer includes an oxygen anion, a sulfur anion, or a nitrogen anion;
   reacting the reactive polymer with carbon disulfide to form a polymer including a dithio carboxyl group; and
   reacting the polymer including the dithio carboxyl group with a blocking agent.

2. The method of claim 1, where the reactive polymer includes a sulfur anion formed by reacting a carbanion-containing polymer with a sulfur-containing compound selected from cyclic sulfides having sufficient ring strain to react with the living polymer, a thiolactone, a dithiolactone, a thioaldehyde, a thioketone, or a mixture thereof.

3. The method of claim 1, where the reactive polymer includes a oxygen anion formed by reacting a living polymer with an oxygen-containing compound selected from cyclic oxides having sufficient ring strain to react with the living polymer, a lactone, an aldehyde, a ketone, or a mixture thereof.

4. The method of claim 1, where the reactive polymer includes a nitrogen anion formed by reacting a living polymer with a nitrogen-containing compound selected from N-alkylated or N-arylated cyclic amines having sufficient ring strain to react with the living polymer, N-alkylated or N-arylated lactams, N-alkylated or N-arylated imines, N-alkylated or N-arylated cyclic ureas, acyclic imines, or a mixture thereof.

5. The method of claim 1, where the blocking agent is selected from the group consisting of phenyldimethylchlorosilane, t-butyldimethylchlorosilane, diphenylmethylchlorosilane, triphenylchlorosilane, trimethylchlorosilane, 2-ethylhexanoyl chloride, acetyl chloride, benzoyl chloride, t-butyl chloride, and mixtures thereof.

6. The method of claim 1, where the method is conducted in solution under an inert atmosphere.

7. The method of claim 1, where said step of reacting with carbon disulfide and said step of reacting with a blocking agent occur within the same solution that the reactive polymer is prepared.

8. A method of preparing a tire, the method comprising:
   preparing a functionalized polymer as set forth in claim 1;
   preparing a rubber formulation that includes the functionalized polymer;
   formulating the rubber formulation into a green tire tread;
   assembling a green tire that includes said green tread; and
   curing said green tire.

9. The method of claim 1, where the reactive polydienyl polymer is prepared by polymerizing conjugated diene monomer to form a polymer chain having a living or reactive chain end, and reacting the living or reactive chain end with a sulfur compound selected from the group consisting of cyclic sulfides having sufficient ring strain to react with the living polymer, a thiolactone, a dithiolactone, a thioaldehyde, a thioketone, and a mixture thereof.

10. The method of claim 1, where the reactive polydienyl copolymer is prepared by polymerizing conjugated diene monomer and monomer copolymerizable therewith to form a copolymer having a living or reactive chain end, and reacting the living or reactive chain end with a sulfur compound selected from the group consisting of cyclic sulfides having sufficient ring strain to react with the living polymer, a thiolactone, a dithiolactone, a thioaldehyde, a thioketone, and a mixture thereof.

11. The method of claim 9, where the living or reactive chain end is reacted with a cyclic sulfide selected from thiiranes and thietanes.

12. The method of claim 10, where the living or reactive chain end is reacted with a cyclic sulfide selected from thiiranes and thietanes.

\* \* \* \* \*